Patented Sept. 5, 1922.

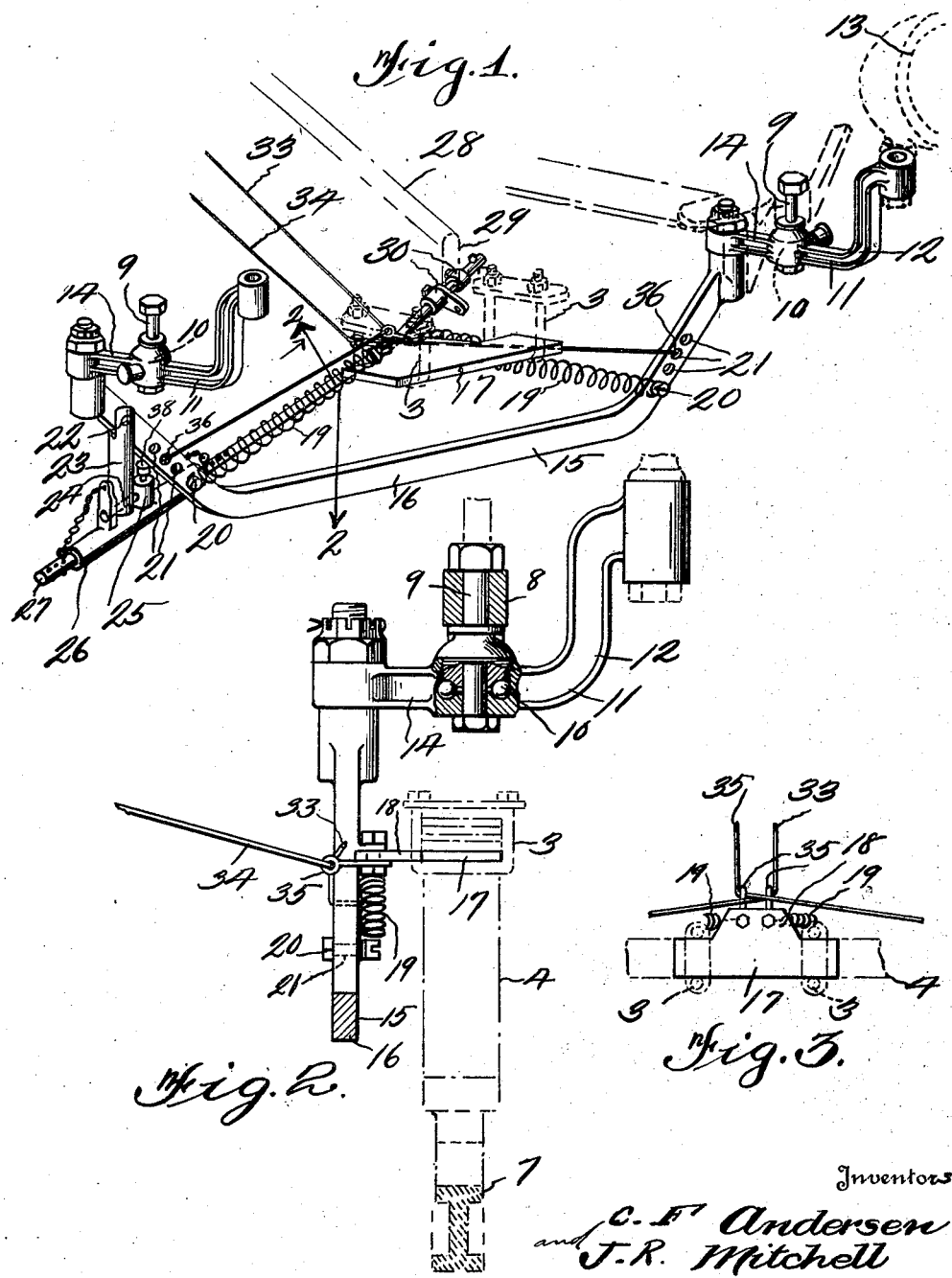

1,428,353

UNITED STATES PATENT OFFICE.

CHRISTIAN FERDINAND ANDERSEN AND JOHN RUSSELL MITCHELL, OF JACKSONVILLE, ILLINOIS.

DIRIGIBLE AUTO HEADLIGHT.

Application filed November 25, 1921. Serial No. 517,641.

*To all whom it may concern:*

Be it known that we, CHRISTIAN F. ANDERSEN and JOHN R. MITCHELL, citizens of the United States, residing at Jacksonville, in the county of Morgan, State of Illinois, have invented new and useful Dirigible Auto Headlights; and we do hereby declare the following to be a full, clear, and exact description of the invention, such as will enable others skilled in the art to which it appertains to make and use the same.

The invention relates to dirigible automobile headlights, and has for its object to provide lights of this character, which lights will move incident to the steering mechanism so as to reflect light upon the road bed ahead of the automobile. Also to provide means whereby the lights may be easily disconnected for forming rigid lights, that is non-movable lights and to provide means whereby non-movable lights may be manually moved.

A further object is to provide spring means for normally returning and maintaining the lights in longitudinal positions.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the lamp actuating mechanism.

Figure 2 is a sectional view through the lamp actuating mechanism taken on line 2—2 of Figure 1.

Figure 3 is a top plan view of the spring receiving plate.

Figure 4:
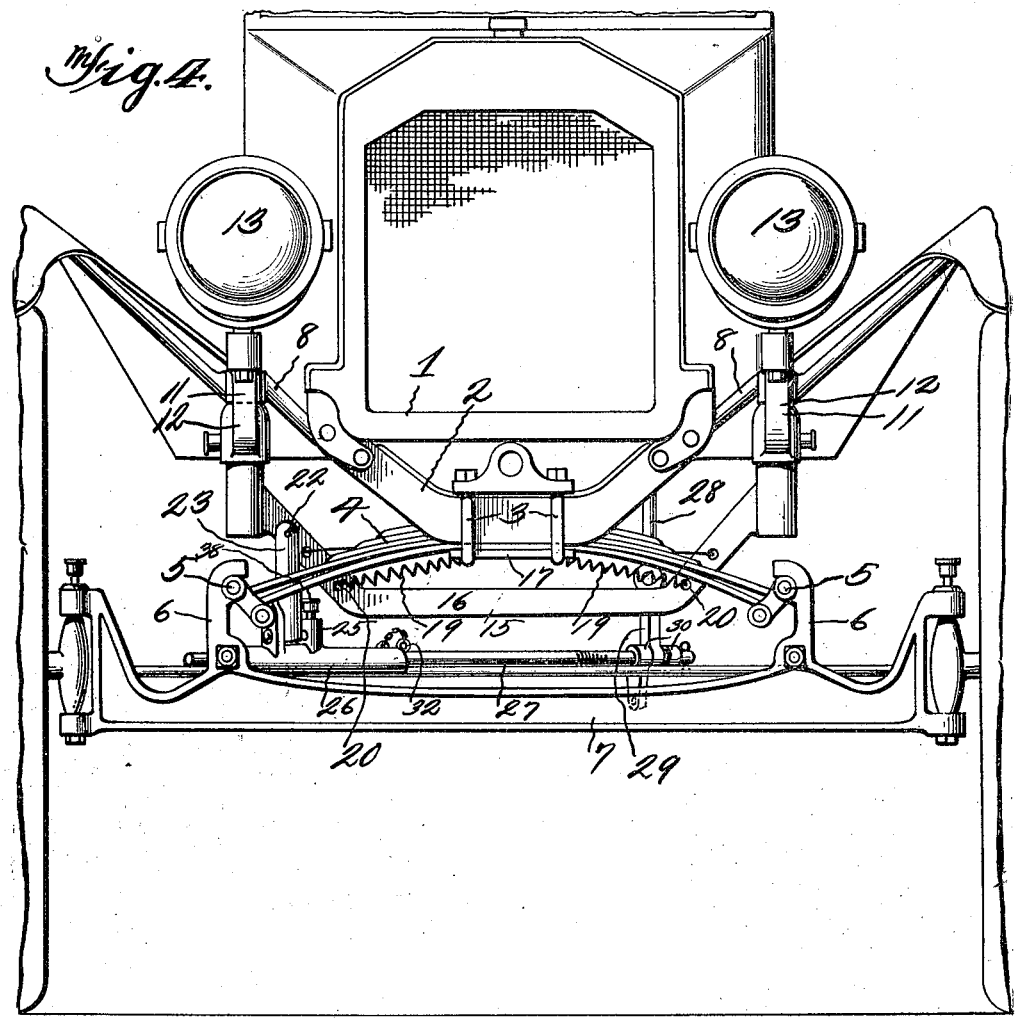
Figure 4 is a front elevation of an automobile showing the dirigible light mechanism applied thereto.
Figure 5:
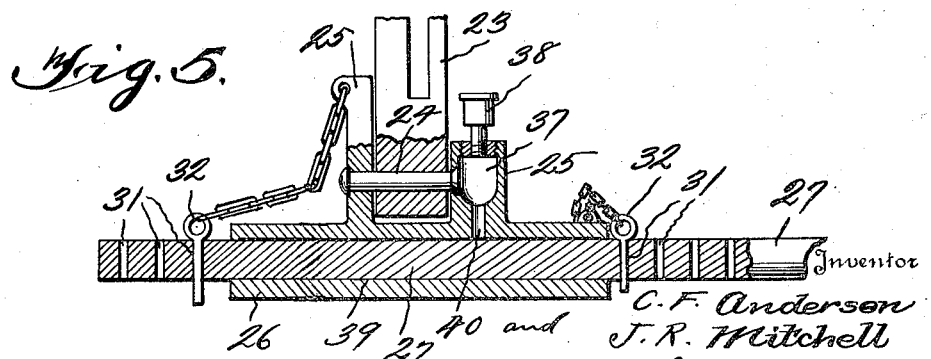
Figure 5 is a sectional view through the sleeve carried by the steering post connecting rod, and a portion of said connecting rod.

Referring to the drawings the numeral 1 designates the front portion of an automobile and 2 the downwardly extending portion of the frame, said downwardly extending portion 2 having secured thereto by means of U-bolts 3 a semi-elliptic spring 4, the ends of which spring are secured at 5 to spring perches 6 of the front axle 7 of the automobile. Pivotally mounted in brackets 8 extending outwardly from the sides of the vehicle frame, are vertically disposed posts 9 on the lower ends of which are, pivotally mounted in antifrictional bearings 10, lamp brackets 11, which lamp brackets have forwardly and upwardly extending lamp supporting arms 12, on which lamps 13 are mounted and rearwardly extending arms 14 which arms are connected together by means of a connecting bar 15. The connecting bar 15 has its body portion 16 offset and downwardly disposed so that it will be clear of the underbody and engine casing of the automobile. The ends of the connecting bar 15 are pivotally connected to the rear ends of the arms 14, therefore it will be seen that when the connecting bar 15 is moved transversely the lamps 13 will be simultaneously moved. Secured to the under face of the spring 4 by means of the U-bolts 3, is a plate 17, which plate is provided with a rearwardly extending portion 18 to which is secured the inner ends of coiled springs 19. The outer ends of the coiled springs 19 are secured to the transversely disposed bar 15 by means of bolts 20, which bolts pass through any of the apertures 21 in the bar 15. By providing a plurality of apertures 21 the tension of the springs may be varied, thereby allowing the springs to be adjusted for accurately maintaining the lamp brackets 12 in longitudinal relation to the automobile when the dirigible headlights are out of operation, said springs also forming means for normally returning the connecting bar 15 to central position.

Pivotally connected to the connecting rod 15 at 22 is a downwardly extending arm 23, the lower end of which is pivotally mounted on a pin 24 carried by spaced lugs 25 of a sleeve 26. The sleeve 26 has slidably mounted therein a rearwardly and inwardly extending connecting rod 27, the inner end of which rod is disposed adjacent the steering post 28 and connected to a downwardly extending arm 29 carried thereby and between adjustable collars 30 of the rod 27 the downwardly extending arm 29 plays according to the position of the collars 30. The rod 27 at each side of the sleeve 26 is provided with a plurality of apertures 31 in any one of which apertures pins 32 may be received, thereby allowing the pins to be adjusted in such a manner that a certain amount of play may take place in the sleeve 26 and rod 27 whereby the lamps will not move on ordinary slight movements of the steering post 28. The pins 32 when removed will allow the rod 27 to move longitudinally through the sleeve 26 in such a manner as not to operate or move the lights, at which time the lights 13 may be manually operated from side to side through the medium of wires or cables 33 and 34, which cables pass through guide eyes 35 carried by the rearwardly extending portion 18 of the plate 17, and thence outwardly and have their ends connected at 36 in one of the apertures 21 in each side of the bar 15. It will be seen that when the pins 32 are removed that during a steering operation the lamps will remain still and be held in longitudinal relation to the automobile by means of the coiled springs 19. However, the operator by imparting a pull upon either the cable 33 or the cable 34 may control the side movement of the lamps in either direction. The lug 25 is provided with an oil reservoir 37 which is supplied with lubricant from an oil cup 38, said reservoir being in connection with the bearing 39 through the oil passage 40, thereby lubricating the connection between the sleeve 26 and the rod 27 and preventing sticking of the same.

From the above it will be seen that a dirigible headlight mechanism is provided which is simple in construction and one which may be manually operated or automatically operated during the steering operation by the steering wheel.

The invention having been set forth what is claimed as new and useful is:—

The combination with dirigible headlights carried by a motor vehicle, said headlights being mounted on a horizontally disposed pivoted bracket, a connecting rod connecting together said brackets whereby they will simultaneously move, springs having their inner ends anchored and their outer ends connected to the connecting rod, a sleeve pivotally connected to one end of the connecting rod, a rearwardly and inwardly extending rod disposed in said sleeve, pins extending through said rod adjacent the ends of the sleeve and allowing loss play between the rod and sleeve, the rear end of said rod being connected to the steering wheel mechanism.

In testimony whereof we have signed our names to this specification in the presence of two subscribing witnesses.

CHRISTIAN FERDINAND ANDERSEN.
JOHN RUSSELL MITCHELL.

Witnesses:
JAMES MORRISON,
GEO. L. WALKER.